US012024842B2

(12) United States Patent
Chen et al.

(10) Patent No.: US 12,024,842 B2
(45) Date of Patent: Jul. 2, 2024

(54) PREVENTION METHOD FOR FLOODS AND DEBRIS FLOWS CAUSED BY GLACIAL LAKE OUTBURSTS

(71) Applicant: INSTITUTE OF MOUNTAIN HAZARDS AND ENVIRONMENT CHINESE ACADEMY OF SCIENCES, Sichuan (CN)

(72) Inventors: Jiangang Chen, Sichuan (CN); Xiaoqing Chen, Sichuan (CN); Peng Cui, Sichuan (CN); Yong You, Sichuan (CN); Huayong Chen, Sichuan (CN); Shuai Li, Sichuan (CN); Jinbo Tang, Sichuan (CN); Wanyu Zhao, Sichuan (CN); Lu Zneg, Sichuan (CN); Xian Wang, Sichuan (CN)

(73) Assignee: INSTITUTE OF MOUNTAIN HAZARDS AND ENVIRONMENT CHINESE ACADEMY OF SCIENCES, Sichuan (CN)

( * ) Notice: Subject to any disclaimer, the term of this patent is extended or adjusted under 35 U.S.C. 154(b) by 85 days.

(21) Appl. No.: 17/783,756

(22) PCT Filed: Aug. 28, 2020

(86) PCT No.: PCT/CN2020/112008
§ 371 (c)(1),
(2) Date: Jun. 9, 2022

(87) PCT Pub. No.: WO2022/016661
PCT Pub. Date: Jan. 27, 2022

(65) Prior Publication Data
US 2023/0002991 A1 Jan. 5, 2023

(30) Foreign Application Priority Data
Jul. 22, 2020 (CN) .............................. 202010714145

(51) Int. Cl.
*E02B 1/00* (2006.01)
*E02B 3/00* (2006.01)
(Continued)

(52) U.S. Cl.
CPC .................. *E02B 7/02* (2013.01); *E02B 1/00* (2013.01); *E02B 3/00* (2013.01); *E02D 5/22* (2013.01)

(58) Field of Classification Search
CPC ..... E02B 7/02; E02B 1/00; E02B 3/00; E02D 5/22; Y02A 10/30; Y02A 10/40
See application file for complete search history.

(56) References Cited

U.S. PATENT DOCUMENTS

2009/0033545 A1* 2/2009 Pilcher, Jr. .............. G01S 13/84
342/127
2018/0275311 A1* 9/2018 Yan ........................ G01D 21/02
2023/0002992 A1* 1/2023 Chen ......................... E02B 7/04

FOREIGN PATENT DOCUMENTS

CN           105740616 A   *  7/2016

* cited by examiner

*Primary Examiner* — Benjamin F Fiorello
(74) *Attorney, Agent, or Firm* — Scully, Scott, Murphy & Presser, P.C.

(57) ABSTRACT

The method for preventing and controlling glacial lake outbreak flood and related debris flows by the present invention is mainly controlling the scale of the floods by separating water and rocks and dispersing its energy step by step. The cascading amplification effects of floods can be reduced by controlling the initiation of source material with energy dissipation by using ground sills, groups of piles, and placed large stones and prefabricated artificial structures. The diversion dam built in the downstream area discharge floods in different layers, which can quickly guide water to the main river. The preconstructed engineering system can be used in a timely manner to prevent and control floods and (Continued)

debris flows induced by a sudden outburst of glacial lakes in areas with important facilities and inhabitants enduring the risk of natural hazards. Prevention and control systems can separate floods and debris flows and dissipate their energy. The groups of ground sills and check dams gradually dissipate the energy of floods, prevent high-energy boulders, and control the initiation of source materials in the channel and bank. Moreover, the systems can also separate the water and rocks in dilute debris flows or debris flows with high bulk densities but low viscosities. The diversion dams also enhance the separation function and keep the flood and debris flow discharge in the lower and upper channel to the main river.

9 Claims, 1 Drawing Sheet

(51) Int. Cl.
      *E02B 7/02*       (2006.01)
      *E02D 5/22*       (2006.01)

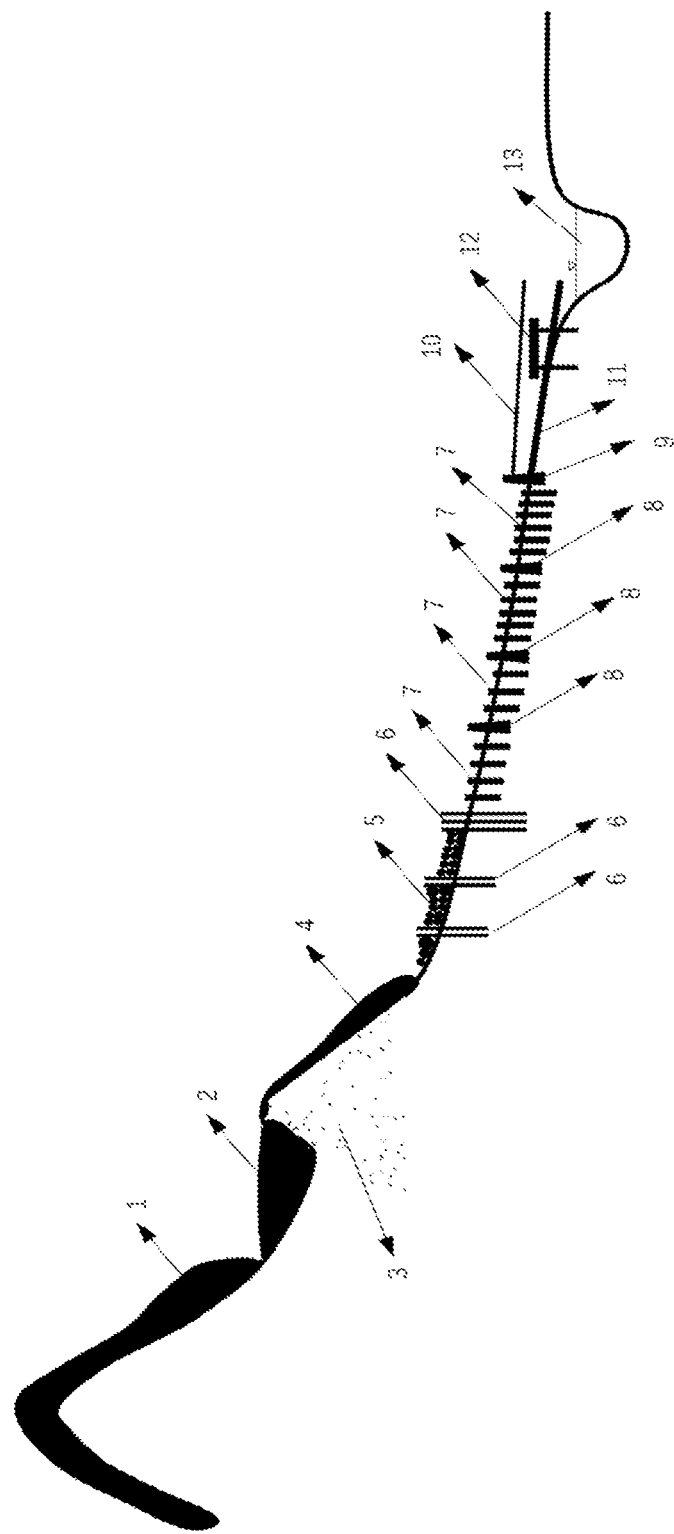

PREVENTION METHOD FOR FLOODS AND DEBRIS FLOWS CAUSED BY GLACIAL LAKE OUTBURSTS

TECHNICAL FIELD

The invention relates to the mitigation method of floods and debris flows induced by the outburst of glacial lakes, which is part of the field of mountain hazard prevention and mitigation as well as engineering design and application.

BACKGROUND OF THE INVENTION

Due to global warming, glacial lake outbursts frequently occur in high-altitude mountainous areas around the world, causing serious economic losses and casualties. From the 1930s to the beginning of the 21st century, a significant increase in glacial lake outbursts occurred globally; specifically, approximately 33 serious glacial lake outbursts, floods, and debris flows were recorded in China. For example, in 1954, Sangwang Co Ice Lake in Kangma County, China, collapsed and formed a catastrophic flood and debris flow that caused approximately 400 deaths, affected more than 20,000 people and seriously destroyed the towns of Gyangze and Rigaze in the middle and lower reaches. The high-incidence zones for glacial lake outbursts are mainly in the transition zone between marine glaciers and continental glaciers, as well as the marine glacial belts in the Palong Tsangpo Basin in Tibet. The outburst of glacial lakes poses a serious threat to the construction, operation, and maintenance of important traffic arteries in eastern Tibet, China.

Under conditions of global warming and the intensification of glacier retreats, moraine lake outbursts are increasing drastically. It has become a special environmental geological disaster that threatens the planned route. According to the distribution of solids in the channel downstream of the moraine dam, outburst of floods may evolve into debris flows. The scale of floods or debris flows caused by glacial lake outbursts is often dozens of times larger than that of normal floods or debris flows, and larger damage is caused correspondingly. As the standards for the construction and the safe operation of major projects has gradually improved, the demand for the prevention and control of glacial lake bursts, floods, and debris flows is becoming increasingly urgent. However, prior techniques do not consider effective treatments for the prevention and control of glacial lake bursts, floods, and debris flows at the watershed scale.

SUMMARY OF THE INVENTION

The purpose of the present invention is to address the deficiencies of prior techniques and thus propose a method for preventing glacial lake burst floods and debris flows. This method can rapidly decrease peak discharge and flow energy through water-rock separation and water flow dispersion. Check dams and hidden barriers can obstruct the formation of debris flows by stabilizing the channel and bank and reduce the risk of cascading enlargement of floods. Floods and debris flows can be smoothly drained downstream through vertical layered holes in check dams, resulting in slight damage to railways, highways, water conservancy projects, residential areas, and farmland.

To solve the abovementioned problems, as an aspect of the present invention, a method for preventing glacial lake outburst floods and debris flows is provided, which includes the following:

Step 1: The planning and design standards for prevention and control engineering systems are determined based on the sediment transport capacity of the main river and the protection level of major objects and facilities, such as villages and towns along the main river. The channel behind the moraine dam is divided into the upstream area, the middle stream area, and the downstream area through field investigation. According to the diameter of the boulders in the upstream area and the sediment sizes in the middle stream area, $D_{90}$ is determined; the distribution of the sediment source and its thickness are further determined; the length, width, and slope of the drainage projects are determined according to the environmental conditions around the railway and highway bridge; and the flood peak discharges are also determined under different conditions of failure ($Q_{Total}$).

Step 2: Pile-group dams are built in the upstream area. Large stones are placed in layers in the reservoir area. If the number of large stones in the channel is not enough for using, prefabricated artificial structures can be placed instead of large stones as supplementary. The spacing between piles in each row of pile groups is b, and the spacing between rows is B; the diameter D of the placed boulders or artificial structures meets D>b, and 1-2 rows of pile groups with interval (50-100) D were set to stabilize the boulders. At the same time, the pile group and the placed boulders formed cascade drops to dissipate the energy of the floods and debris flows.

Step 3: In the midstream area, after constructed groups of ground sills, a check dam should be built, the ground sills and the check dam present spacing arrangement. This arrangement can prevent rapid erosion induced by outbreaking floods and to control the source of the channel and bank to form debris flows.

Step 4: In the downstream area, a controlled check dam is built to divert the floods and debris flow to the main river through the drainage channels located below and above the top of the railway and highway bridges.

Preferably, the cascade drops are formed by the pile-group dams and the boulders or artificial structures stacked upstream to dissipate the energy of the flood, the height of the cascade drops is (2-4) D and the length is (50-100) D.

Ideally, the burial depth of a single pile should be larger than (10-20)D, and the height above the ground should be greater than (5-10)D. The stacking height of the boulders or the artificial structures is 0.5-0.8 times the height of the pile group above the ground, and the space among the boulders is (0.25-0.5)D to allow water to pass through.

If possible, the top width and the height above the ground of the sills are d and (2-5) d, respectively. The burial depth of the sills is 1.0-2.0 times the height above the ground. The bottom of sills is built with a pile foundation. The width of the pile foundation is (3-5)d, and the depth of the pile foundation is 1.5-3 times the spacing between the pile foundations.

Preferably, the check dam with a large opening that plays a role in blocking large stones and passing fine particles. The width of the discharge hole is 1.2-2.0 times the diameter $D_{90}$ of the rock distributed in the upstream channel. The height of the discharge hole is 1-2 times the width of the discharge hole.

Ideally, the designed discharge of the diversion dam or the control dam satisfies the relationship $Q_{div,Total}=Q_{Up}+Q_{Down}$, and the height between the bottom surface of the upper drainage channel and the top surface of the railway or highway bridge needs to satisfy the following relationship: $H_d=\eta H_v$. $\eta$ is the safety factor, which is generally $\eta=1.5$-3.0; $H_v$ is the maximum height of passing vehicles; the discharging spillway elevation of the dam is determined according to the distance from the diversion dam or control dam to the bridge and the design slope of the upper drainage channel ($J_{up}$).

The method for determining the flood discharges at the upper and bottom of the control dam is as follows:

(1) The maximum flood discharge ($Q_{dra,Down}$) of the lower drainage channel is calculated according to the width $B_{Down}$ and the flood depth $h_{Down}$ of the lower drainage channel that is allowed to pass through the highway and railway bridges. The calculation formula is as follows:

$$Q_{dra,Down} = \frac{1}{n}(B_{Down} \times h_{Down})\left(\frac{B_{Down} \times h_{Down}}{B_{Down} + 2h_{Down}}\right)^{2/3} J_{Down}^{1/2}$$

(2) The scale of the floods and debris flows induced by glacial lake outbreaks is large or extra-large. When floods flow to the diversion dam, orifice outflow occurs; thus, the flow area ($A_{Down}$) is determined according to the following formula:

$$A_{Down} = b_{hole} h_{hole} = \frac{Q_{Down}}{\mu\sqrt{2gH_{down}}}$$

where $\mu$ is the discharge coefficient, $b_{hole}$ is the width of the discharge hole, g is the acceleration of gravity, and $H_{Down}$ is the water depth above the bottom of the discharge hole.

(3) The design discharge ($Q_{dra,Down}$) of the lower drainage channel and the discharge of the discharge hole ($Q_{Down}$) need to meet the condition $Q_{dra,Down} > kQ_{Down}$, where k is the safety factor. According to the proposed width $B_{Down}$ and the water depth $h_{Down}$ of the lower drainage channel and the condition of $B_{Down} > \beta b_{hole}$, the width $b_{hole}$ and height $h_{hole}$ of the discharge hole were determined. $B_{Down}$ and $b_{hole}$ are the widths of the drainage channel and discharge hole, respectively, and $\beta$ is the proportional coefficient of the cross-sectional width.

(4) The maximum discharge of the upper drainage channel is $Q_{dra,Up}$. The width $B_{Up}$ and the depth $h_{Up}$ of the upper drainage channel are determined according to the terrain conditions; thus, the maximum flood discharge is calculated as follows:

$$Q_{dra,Up} = \frac{1}{n}(B_{Up} \times h_{Up})\left(\frac{B_{Up} \times h_{Up}}{B_{Up} + 2h_{Up}}\right)^{2/3} J_{Up}^{1/2}$$

(5) The width of the overflow weir of the control check dam is determined by:

$$b_{weir} = \frac{Q_{Up}}{m\sqrt{2g}\, H_{weir}^{3/2}}$$

where m is the discharge coefficient, $b_{weir}$ is the width of the overflow weir, g is the acceleration of gravity, and $H_{weir}$ is the water depth above the bottom of the overflow weir.

(6) The designed flood discharge $Q_{dra,Up}$ of the upper drainage channel, and the flow discharge $Q_{Up}$ of the overflow weir need to meet the relationship $Q_{dra,Up} > kQ_{Up}$, where k is the safety factor. According to the proposed width $B_{Up}$ and the water depth $h_{Up}$ of the upper drainage channel and the condition of $B_{Up} > \beta b_{weir}$, the width $b_{weir}$ of the overflow weir is determined. $B_{Up}$ and $b_{weir}$ are the width of the drainage channel and the width of the overflow weir, respectively, and $\beta$ is the proportional coefficient of the cross-sectional width.

Preferably, the safety factor k is determined (1.2-3.0) according to the outburst risk of glacial lakes and the importance of protecting downstream objects; the coefficient of the width of flowing section $\beta$ is 1.5-3.0.

Ideally, the geometry of the upper and lower drainage channels can be designed as rectangular, compound, and asymmetric shapes. The flood discharge capacity should be checked according to the different geometries of the channels.

Compared with prior techniques, the present invention has the following benefits: the preconstructed engineering system can be used in a timely manner to prevent and control floods and debris flows induced by a sudden outburst of glacial lakes in areas with important facilities and inhabitants under the risk of natural hazards. The ground sills and check dams gradually dissipate the energy of the floods, prevent high-energy boulders, and control the initiation of source materials in the channel and bank. Moreover, the hazard mitigation systems can also separate the flood and stones in dilute debris flows or debris flows with high density but low viscosity. Further, the diversion dam can allocate the discharge of the flood and debris flow into the lower and upper drainage channels, and the drainage channels smoothly discharge the flood and debris flow to the main river. The entire system constructed along the gully can minimize the threats and hazards to railways, highways, bridges, and tunnels in downstream areas.

BRIEF DESCRIPTION OF THE DRAWINGS

FIGURE shows a schematic diagram of the present invention.

The reference signs in the FIGURE are as follows: 1: Glacier; 2: Glacier lake; 3: Moraine dam; 4: Flood-breaking debris flow; 5: Boulders; 6: Pile-group dams; 7: Energy-dissipating submerged sills; 8: Check dam; 9: Diversion dam or flow control check dam; 10: Upper drainage channel; 11: Lower drainage channel; 12: Bridge; 13: Downstream main river.

DESCRIPTION OF THE EMBODIMENT

The embodiments of the invention are described in detail below, but the invention can be implemented in many different ways defined and covered by the claims.

The method for preventing and controlling glacial lake outbreak floods and its related debris flows in the present invention is mainly controlling the floods scale by separating water and stones and dispersing its energy. The cascading amplification effects of floods can be reduced by controlling the initiation of source material with step by step energy dissipation. The diversion dam built in the downstream can allocate the discharge of the flood and debris flow into the lower and upper drainage channels, which can quickly discharge flood to the main river.

Compared with prior techniques, the preconstructed engineering system can be used in a timely manner to prevent and control floods and debris flows induced by a sudden outburst of glacial lakes in areas with important facilities and inhabitants under the risk of natural hazards. The ground sills and check dams gradually dissipate the energy of the floods, prevent high-energy boulders, and control the initiation of source materials in the channel and bank. Moreover, the hazard mitigation systems can also separate the flood and stones in dilute debris flows or debris flows with high density but low viscosity. Further, the diversion dam can allocate the discharge of the flood and debris flow into the lower and upper drainage channels, and the drainage channels smoothly discharge the flood and debris flow to the main river. The entire system constructed along the gully can minimize the threats and hazards to railways, highways, bridges, and tunnels in downstream areas.

The general idea of the present invention is to control the scale of outbreaking flood and debris flows by dispersing flow and dissipating energy, as well as to reduce the cascading amplification effects of floods by controlling the initiation of source material with step-by-step energy dissipation, and allocate the discharge reasonably to the drainage channels, this is helpful to protect infrastructures and inhabitants.

Case 1

A basin on the Qinghai-Tibet Plateau is a branched gully to the left of the upper reaches of Palong Tsangpo. Its drainage area is 118 km² and it contains a glacial lake located at an altitude of 3800 m. The length of the channel in the downstream of the glacial lake is 10 km, and the average slope is approximately 5%. Ascertained by field investigation, the storage capacity of the glacial lake is approximately 300×10⁴ m³ when the glacial lake is full of water. The glacial lake broke in 1988, and the maximum peak discharge reached 1150 m³/s. To minimize the threats and hazards to railways, highways, water conservancy facilities, residential areas, and farmland in the lower reaches of the glacial lake, the method for preventing glacial lake outburst flood and debris flows via the present invention is adopted, and the detailed implementations are as follows:

Step 1: According to the field survey and the actual topographical conditions, 0-2 km downstream of the moraine dam is defined as the upstream area, 2-7 km is defined as the midstream area, and 7-10 km is defined as the downstream area. The average channel width in the upstream region is 15 m. The $D_{90}$ of the source materials in the midstream area is 0.4 m, which is determined through sampling and sieve tests. According to remote sensing images, the designed slope of the drainage channel in the downstream area is approximately 5-15°. According to the depth and area of the glacial lake and the importance of protecting downstream objects, the maximum peak discharge at the location of the moraine dam breakage is determined as $Q_{Total}$=1300 m³/s, and the maximum peak discharge of the flood-breaking debris flow at the location of the diversion dam in the downstream area is $Q_{div,Total}$=1050 m³/s. The net height under the bridge of the downstream highway bridge is 10.7 m, and the bridge passes over three channels. The peak discharge that the bridge can pass over is 550 m³/s under normal operation.

Step 2: The pile-group dams are arranged as triangle shapes in the upstream area. The spacing between piles in each row of pile groups is b=1.0 m, and the spacing between rows is 2 m. Large boulders with diameters of D=2-3 m are artificially placed in the reservoir area. The stability of the boulders is maintained by installing one pile group every 100 m. A 300 m multistep energy-dissipating section is built with mixtures of auxiliary piles and boulders. The multistep energy-dissipating section results in a hydraulic jump with a height of 11 m. The depth of the pile buried in the soil is 30 m, and the height above the ground is 15 m. The stacking height of the large boulders is 10 m, and the spacing between the large boulders is set to 1 m to ensure the passage of water.

Step 3: A total of 10 ground sills (top width d=1 m, 1.5 m above the ground, and 2 m beneath the ground) are built in the middle reaches. To ensure the safety of the sills, a pile foundation (depth: 5 m) with a space of approximately 3 m is set. An open-type check dam is constructed downstream of the sills. According to the topographical conditions, the dam height, bottom width, and top width are proposed to be 5 m, 10 m, and 18 m, respectively. Two rows of discharge holes (5 in each row with a space of 1.2 m) are designed, and the spacing between the rows is 2 m. Combining the particle size ($D_{90}$) obtained from the survey in step 1, the designed discharge hole has a width of 0.8 m and a height of 1.2 m.

Step 4: A large diversion dam is built in the downstream area to separate the flood and debris flows into the two channels. The flow discharges are discharged to the main river through the drainage channel located at the lower part of the railway bridge. The flow distribution of the diversion dam must satisfy $Q_{div,Total}=Q_{Up}+Q_{Down}$. According to the field survey results in step 1 and the scope of the debris retention basin, a flood discharge of 650 m³/s to $Q_{Up}$ and a flood discharge of 400 m³/s to $Q_{Down}$ under the condition of $Q_{div,total}$=1050 m³/s are planned for allocation. According to the channel morphology, the design of the diversion dam is proposed to have a lower width of 13 m, an upper width of 25 m, and a height of 6.5 m. Therefore, the upstream width of the back-silting section is also 13 m. According to this classification standard, the diversion dam is designed as follows:

(1) The depth and velocity of the flood and debris flow in front of the diversion dam are calculated according to the maximum discharge $Q_{div,total}$ in front of the diversion dam. Namely, the flow depth is obtained ($h_{front}$=5.5 m) by inversing the formula $$Q_{div,Total} = \frac{1}{n}(B_{front} \times h_{front})\left(\frac{B_{front} \times h_{front}}{B_{front} + 2h_{front}}\right)^{2/3} J_{front}^{1/2},$$

where n=0.04 and J=0.08. Then, the flow velocity is calculated as $$v_{front} = \frac{Q_{div,Total}}{B_{front}h_{front}} = 14.7 \text{ m/s}.$$

(2) The maximum discharge $Q_{dra,Down}$ of the lower drainage channel is calculated using the following formula:

$$Q_{dra,Down} = \frac{1}{n}(B_{Down} \times h_{Down})\left(\frac{B_{Down} \times h_{Down}}{B_{Down} + 2h_{Down}}\right)^{2/3} J_{Down}^{1/2},$$

where n is the roughness coefficient, $B_{Down}$ is the width of the drainage channel, and $h_{Down}$ is the maximum flood depth that usually equals the depth of the drainage channel. According to the survey data in step 1 and the parameters of the proposed drainage channel (n=0.025, $B_{Down}$=17 m, $h_{Down}$=3 m, and J=0.12), the maximum flow discharge is calculated as $Q_{dra,Down}$=1201 m³/s. Under the condition of the safety factor k=1.2, the proposed scheme satisfies $Q_{dra,Down}>1.2Q_{Down}$, which means that the designed lower drainage channel is reasonable.

(3) The debris flows discharged from the bottom drainage hole of the diversion dam are mainly under restrictions to the discharge ability of lower drainage channel. To ensure that the debris flow in the bottom discharge hole is in the state of free orifice flow, the condition of $h_{hole}/h_{front} \leq 0.65$ should be satisfied. The height of the discharge hole should be set to 3.5 m based on the results in (1).

(4) According to the survey data in step 1 and Manning's formula, the velocity in front of the diversion dam is 14.7 m/s when a peak discharge $Q_{div,total}=1050$ m³/s appears at the diversion dam. The total water head in front of the discharge hole is $$H_0 = h_{front} + \frac{v^2}{2g} = 16.3 \text{ m.}$$

Then, the discharge coefficient is calculated, $$\mu = \varepsilon \varphi \sqrt{1 - \varepsilon \frac{h_{hole}}{H_0}} = 0.574,$$

where $\varepsilon$ is the vertical shrinkage coefficient that equals 0.67 and $\varphi$ is the velocity coefficient that equals 1.0. Furthermore, the area of the discharge hole in the diversion dam is calculated, $$A = \frac{Q_{Down}}{\mu \sqrt{2gH_0}} = 38.5 \text{ m}^2.$$

Since the height of the discharge hole is 3.5 m, the width of the discharge hole, $b_{hole}=11$ m. It is known that the width of the lower drainage channel is $B_{Down}=17$ m from (1), and the coefficient of the cross-sectional width of the flow is taken to be $\beta=1.5$. This means that the designed parameter satisfies $B_{Down} > \beta b_{hole}$. Therefore, the design of the position and the geometric parameters of the drain hole is reasonable.

(5) The maximum flow discharge $Q_{dra,Up}$ of the upper drainage channel is calculated using the following formula:

$$Q_{dra,Up} = \frac{1}{n}(B_{Up} \times h_{Up})\left(\frac{B_{Up} \times h_{Up}}{B_{Up} + 2h_{Up}}\right)^{2/3} J_{Up}^{1/2}$$

where n is the roughness coefficient, $B_{Up}$ is the width of the drainage channel, and $h_{Up}$ is the maximum water depth that usually equals the depth of the drainage channel. According to the survey data in step 1 and the parameters of the proposed drainage channel (n=0.025, $B_{Up}=12$ m, $h_{Up}=4$ m, and J=0.11), the maximum flow discharge is calculated as $Q_{dra,Up}=1141$ m³/s. Under the condition of the safety factor k=1.2, the proposed scheme satisfies $Q_{dra,Up} > 1.2 Q_{Up}$, which means that the designed upper drainage channel is reasonable.

(6) The debris flow discharged from the overflow weir of the diversion dam are mainly guided to the upper drainage channel. The depth of the proposed overtopping weir is 2.5 m. Then, the total water head at the overtopping weir is $H_{weir}=17.8$ m. The width of the overflow weir is calculated, $$b_{weir} = \frac{Q_{Up}}{m\sqrt{2g}H_{weir}^{3/2}} = 4.03m,$$

where the discharge coefficient m=0.48. The coefficient of the cross-sectional width of the flow is taken to be $\beta=1.5$. This means that the designed parameter satisfies $B_{Up} > \beta b_{weir}$ according to the width of the upper drainage channel $B_{Up}=12$ m. Therefore, the design of the position and the geometric parameters of the overtopping weir is reasonable.

Case 2

A basin on the Qinghai-Tibet Plateau is located in Gongbujiangda County. Its drainage area is 150 km², and it contains a glacial lake located at an altitude of 5000 m. The length of the channel in the lower reaches of the glacial lake is 20 km, and the average slope is approximately 5%. Through field investigation, the storage capacity of the glacial lake is approximately $600 \times 10^4$ m³ when the glacial lake is full of water. The glacial lake broke in 1964, and the maximum peak discharge reached 2800 m³/s. To minimize the threats and hazards to railways, highways, water conservancy facilities, residential areas, and farmland in the lower reaches of the glacial lake, the method for preventing glacial lake outburst debris flows via the present invention is adopted, and the detailed implementations are as follows:

Step 1: According to the field survey and the actual topographical conditions, 0-3 km downstream of the moraine dam is defined as the upstream area, 3-15 km is defined as the midstream area, and 15-20 km is defined as the downstream area. The average channel width in the upstream region is 12 m. The $D_{90}$ of the source materials in the midstream area is 0.5 m, which is determined through the sample and sieve tests. According to remote sensing images, the design slope of the drainage channel in the downstream area is approximately 5-15°. According to the depth and area of the glacial lake and the importance of protecting downstream objects, the maximum peak discharge at the location of the moraine dam breakage is determined as $Q_{Total}=3500$ m³/s, and the maximum peak discharge of the floods and debris flow at the location of the diversion dam in the downstream area is $Q_{div,Total}=2800$ m³/s. The net height under the bridge of the downstream highway bridge is 19.7 m, and the e peak discharge that can pass over is 1500 m³/s under normal operation.

Step 2: The pile-group dams have a triangular arrangement in the upstream area. The spacing between piles in each row of pile groups is b=0.75 m. Large boulders with diameters of D=1.5-3 m are artificially placed in the reservoir area. The stability of the boulders is maintained by installing one pile group every 100 m. A 300 m multistep energy-dissipating section is built with mixtures of auxiliary piles and boulders. The multistep energy-dissipating section results in a hydraulic jump with a height of 12 m. The depth of the pile buried in the soil is 30 m, and the height above the ground is 20 m. The stacking height of the large boulders is 15 m, and the spacing between the large boulders is set to 0.75 m to ensure the passage of water.

Step 3: A total of 10 ground sills (top width d=1 m, 1.5 m above the ground, and 2 m beneath the ground) are built in the middle reaches. To ensure the safety of the sills, a pile foundation (depth: 5 m) with a space of approximately 3 m is set. An open-type check dam is constructed downstream of the sills. According to the topographical conditions, the dam height, bottom width, and top width are proposed to be 5 m, 12 m, and 15 m, respectively. Two rows of discharge holes (4 in each row with spacing of 1 m) are designed, and the spacing between the rows is 2 m. Combining the particle size ($D_{90}$) obtained from the survey in step 1, the designed discharge hole has a width of 1 m and a height of 1.5 m.

Step 4: A large diversion dam is built in the downstream area to separate the discharge of flood and debris flows. The flood and debris flows were discharged to the main river through the drainage channel located at the lower part of the railway bridge. The flow distribution of the diversion dam must satisfy $Q_{div,Total}=Q_{Up}+Q_{Down}$. According to the field survey results in step 1 and the scope of the debris retention basin, a flood discharge of 2000 m³/s to $Q_{Up}$ and a flood discharge of 800 m³/s to $Q_{Down}$ under the condition of $Q_{div,total}$=2800 m³/s is planned for allocation. According to the channel morphology, the design of the diversion dam is planned to have a lower width of 25 m, an upper width of 35 m, and a height of 7.5 m. Therefore, the upstream width of the back-silting section is also regarded as 25 m. According to this classification standard, the diversion dam is designed as follows:

(1) The depth and velocity of the debris flow in front of the diversion dam are calculated according to the maximum discharge $Q_{div,total}$ in front of the diversion dam. Namely, the flow depth is obtained ($h_{front}$=6.5 m) by inversing the formula $$Q_{div,Total} = \frac{1}{n}(B_{front} \times h_{front})\left(\frac{B_{front} \times h_{front}}{B_{front} + 2h_{front}}\right)^{2/3} J_{front}^{1/2},$$

where n=0.04 and J=0.07. Then, the flow velocity is calculated as $$v_{front} = \frac{Q_{div,Total}}{B_{front}h_{front}} = 17.2 \text{ m/s}.$$

(2) The maximum flow discharge $Q_{dra,Down}$ of the lower drainage channel is calculated using the following formula:

$$Q_{dra,Down} = \frac{1}{n}(B_{Down} \times h_{Down})\left(\frac{B_{Down} \times h_{Down}}{B_{Down} + 2h_{Down}}\right)^{2/3} J_{Down}^{1/2},$$

where n is the roughness coefficient, $B_{Down}$ is the width of the drainage channel, and $h_{Down}$ is the maximum water depth that usually equals the depth of the drainage channel. According to the survey data in step 1 and the parameters of the proposed drainage channel (n=0.028, $B_{Down}$=31 m, $h_{Down}$=2.5 m, and J=0.11), the maximum flow discharge is calculated $Q_{dra,Down}$=1530 m³/s. Under the condition of the safety factor k=1.5, the proposed scheme satisfies $Q_{dra,Down}$>1.5$Q_{Down}$, which means that the designed lower drainage channel is reasonable.

(3) The debris flows discharged from the bottom drainage hole of the diversion dam are mainly guided to the lower drainage channel. To ensure that the debris flow in the bottom discharge hole is in the state of free orifice flow, the condition of $h_{hole}/h_{front}$<0.65 should be satisfied. The height of the discharge hole should be set to 4 m.

(4) According to the survey data in step 1 and Manning's formula, the flow velocity in front of the diversion dam is 17.3 m/s when a peak discharge $Q_{div,total}$=2800 m³/s appears at the diversion dam. The total water head in front of the discharge hole is $$H_0 = h_{front} + \frac{v^2}{2g} = 21.5 \text{ m}.$$

Then, the discharge coefficient is calculated, $$\mu = \varepsilon\varphi\sqrt{1 - \varepsilon\frac{h_{hole}}{H_0}} = 0.59,$$

where $\varepsilon$ is the vertical shrinkage coefficient that equals 0.67 and $\varphi$ is the velocity coefficient that equals 1.0. Furthermore, the area of the discharge hole in the diversion dam is calculated as $$A = \frac{Q_{Down}}{\mu\sqrt{2gH_0}} = 65.4 \text{ m}^2.$$

Since the height of the discharge hole is 4 m, the width of the discharge hole, $b_{hole}$=16.4 m. It is known that the width of the lower drainage channel is $B_{Down}$=31 m from (1), and the coefficient of the cross-sectional width of the flow is taken to be $\beta$=1.5. This means that the designed parameter satisfies $B_{Down}$>$\beta b_{hole}$. Therefore, the design of the position and the geometric parameters of the drain hole are reasonable.

(5) The maximum flow discharge $Q_{dra,Up}$ of the upper drainage channel is calculated using the following formula:

$$Q_{dra,Up} = \frac{1}{n}(B_{Up} \times h_{Up})\left(\frac{B_{Up} \times h_{Up}}{B_{Up} + 2h_{Up}}\right)^{2/3} J_{Up}^{1/2}$$

where n is the roughness coefficient, $B_{Up}$ is the width of the drainage channel, and $h_{Up}$ is the maximum water depth that usually equals the depth of the drainage channel. According to the survey data in step 1 and the parameters of the proposed drainage channel (n=0.028, $B_{Up}$=25 m, $h_{Up}$=5 m, and J=0.12), the maximum flow discharge is calculated as $Q_{dra,Up}$3613 m³/s. Under the condition of the safety factor k=1.5, the proposed scheme satisfies $Q_{dra,Up}$>1.5$Q_{Up}$, which means that the designed upper drainage channel is reasonable.

(6) The debris flows discharged from the overflow weir of the diversion dam are mainly guided to the upper drainage channel. The depth of the proposed overflow weir is 1.8 m. Then, the total water head at the overtopping weir is $H_{weir}$=15.8 m. The width of the overtopping weir is calculated, $$b_{weir} = \frac{Q_{Up}}{m\sqrt{2g}\,H_{weir}^{3/2}} = 14.83m,$$

where the discharge coefficient m=0.48. Here, we adopt $b_{weir}$=14.9 m. The coefficient of the cross-sectional width of the flow is taken to be $\beta$=1.5. This means that the designed parameter satisfies $B_{Up}$>$\beta b_{weir}$ according to the width of the upper drainage channel $B_{Up}$=25 m. Therefore, the design of the position and the geometric parameters of the overtopping weir are reasonable.

The risk of moraine dam outbursts and their potential threats downstream are becoming more intense as a result of climate change. Combined with the proposed methods of strengthening the moraine dam, this invention introduces a method of preventing and controlling outburst floods and debris flows from the perspective of the watershed. This method works effectively in regulating the cascading amplification of large-scale glacial lake outbreak floods and related debris flows, specifically, controlled the gully bed erosion and alleviate the blocking effects. Thus, roads, railways, and other major projects, as well as inhabitants and their properties in the downstream area, can be well protected. The present invention has significant practical significance and engineering applications in glacial lake outbursts related hazard mitigation.

The abovementioned cases are only preferred embodiments of the present invention and do not specifically limit the present invention. For technicians in this research field, the present invention can have various modifications and changes. Any modification, equivalent replacement, improvement, etc. made within the spirit and principle of the present invention should be included in the protection scope of the present invention.

The invention claimed is:

1. A method for mitigating floods and debris flows induced by glacial lake outbursts, comprising:

step 1: identifying a glacial lake, wherein the glacial lake is formed by a glacial moraine dam to retain rainfall and glacial melt water; identifying a flood discharge channel located downstream of the glacial lake, wherein the flood discharge channel guides flood and debris flow to a main river; divide the flood discharge channel into an upstream area, a downstream area, and a midstream area between the upstream area and the downstream area; determining a peak flow ($Q_{Total}$) of the glacial lake based on at least on-site data;

step 2: building pile-group dams in the upstream area; placing stones in layers in a reservoir area;

wherein the spacing between piles in each row of pile groups is b, and the spacing between rows is B; the diameter D of the stones meets D>b, and multiple pile-group dams with spacing L are set to stabilize the stones; at the same time, the pile group and the stones form cascade drops to dissipate the energy of the floods and debris flows;

step 3: building groups of ground sills and subsequent check dams in the midstream area to prevent erosion induced by breaking floods and to control the source of the channel and bank to form debris flows;

step 4: constructing a diversion dam and a drainage structure, wherein the diversion dam is located at an inlet of the downstream area for allocating discharge of floods and debris flows, wherein the drainage structure comprises a drainage channel running below a protected object and a drainage trough running over a top of the protected object in alluvial fan, wherein both the drainage channel and the drainage trough discharge floods and debris flows to the main river;

wherein the discharge of the diversion dam satisfies the relationship $Q_{div,Total}=Q_{Up}+Q_{Down}$, wherein $Q_{up}$ is the discharge of floods and debris flows passing a spillway of the diversion dam, $Q_{Down}$ is the discharge of floods and debris flows passing a discharge hole of the diversion dam; and wherein the height between the bottom surface of an upper drainage channel and the protected object in the alluvial fan satisfies the following relationship: $H_d=\eta H_v$, $\eta$ is the safety factor, which is taken as $\eta=1.5$-$3.0$; $H_v$ is the maximum height of the protected object in the alluvial fan; wherein the elevation of spillway of the dam is determined according to the distance from the diversion dam to the protected object in the alluvial fan and the design slope of the upper drainage channel ($J_{Up}$);

wherein determining the flood discharges passing through discharge hole ($Q_{Down}$) and the spillway ($Q_{Up}$) is implemented as follows:

(1) the maximum flow discharge ($Q_{dra,Down}$) of the lower drainage channel is calculated according to the width $B_{Down}$ and the water depth $h_{Down}$ of the lower drainage channel that is allowed to pass through the protected object in the alluvial fan, wherein the calculation formula is:

$$Q_{dra,Down} = \frac{1}{n}(B_{Down} \times h_{Down})\left(\frac{B_{Down} \times h_{Down}}{B_{Down} + 2h_{Down}}\right)^{2/3} J_{Down}^{1/2};$$

(2) when floods flow to the diversion dam, the flow area ($A_{Down}$) of the discharge hole is determined according to the following formula:

$$A_{Down} = b_{hole}h_{hole} = \frac{Q_{Down}}{\mu\sqrt{2gH_{down}}},$$

where $\mu$ is the discharge coefficient, $b_{hole}$ is the width of the discharge hole, $h_{hole}$ is the height of the discharge hole, g is the acceleration of gravity, and $H_{down}$ is the water depth above the bottom of the discharge hole;

(3) the designed discharge ($Q_{dra,Down}$) of the lower drainage channel and the discharge ($Q_{Down}$) of the discharge hole meet the condition $Q_{dra,Down}>kQ_{Down}$, where k is the safety factor; wherein according to the proposed width $B_{Down}$ and the water depth $h_{Down}$ of the lower drainage channel and the condition of $B_{Down}>\beta b_{hole}$, the width $b_{hole}$ and height $h_{hole}$ of the discharge hole are determined; $B_{Down}$ and $b_{hole}$ are the width of the drainage channel and the discharge hole, respectively, and $\beta$ is the proportional coefficient of the cross-sectional width;

(4) the maximum flow discharge of the upper drainage channel is $Q_{dra,Up}$, wherein $B_{Up}$ and $h_{Up}$ are the width and the depth of the upper drainage channel, respectively; and the maximum flow discharge is calculated as follows:

$$Q_{dra,Up} = \frac{1}{n}(B_{Up} \times h_{Up})\left(\frac{B_{Up} \times h_{Up}}{B_{Up} + 2h_{Up}}\right)^{2/3} J_{Up}^{1/2};$$

(5) the width of the spillway of the diversion dam is determined by:

$$b_{weir} = \frac{Q_{Up}}{m\sqrt{2g}\,H_{weir}^{3/2}},$$

where m is the discharge coefficient, $b_{weir}$ is the width of the spillway, g is the acceleration of gravity, and $H_{weir}$ is the water depth above the floor of the spillway;

(6) the designed discharge ($Q_{dra,Up}$) of the upper drainage channel, and the flow discharge ($Q_{Up}$) of the overflow weir need to meet the relationship $Q_{dra,Up} > kQ_{Up}$, where k is the safety factor; wherein according to the proposed width $B_{Up}$, the water depth $h_{Up}$ of the upper drainage channel and the condition of $B_{Up} > \beta b_{weir}$, the width $b_{weir}$ of the spillway is determined; $B_{Up}$ and $b_{weir}$ are the width of the drainage channel and the width of the spillway, respectively, and β is the proportional coefficient of the cross-sectional width.

2. The prevention method for floods and debris flows caused by glacial lake outbursts according to claim 1, wherein the pile-group dam and the stones are stacked upstream to form cascade drops to dissipate the energy of the floods and debris flows.

3. The prevention method for floods and debris flows caused by glacial lake outbursts according to claim 1, wherein the burial depth of a single pile is larger than (10-20)*D, and the height above the ground is larger than (5-10)*D; the stacking height of the stones is 0.5-0.8 times the height of the pile group above the ground, and the space among the stones is (0.25-0.5)*D to allow flood to pass through.

4. The prevention method for floods and debris flows caused by glacial lake outbursts according to claim 1, wherein the top width and the height above the ground of the energy-dissipating ground sills are d and (2-5)*d, respectively; wherein the burial depth of the energy-dissipating ground sills is 1.0-2.0 times the height above the ground; wherein the bottom of the energy-dissipating ground sills is built with a pile foundation; wherein the width of the pile foundation is (3-5)*d, and the depth of the pile foundation is 1.5-3 times the spacing between the pile foundations.

5. The prevention method for floods and debris flows caused by glacial lake outbursts according to claim 1, wherein the check dam is a large opening check dam that plays a role in blocking coarse grains and drainage fines; wherein the width of the discharge hole is 1.2-2.0 times the diameter of rocks distributed in the upstream channel; wherein the height of the discharge hole is 1-2 times the width of the discharge hole.

6. The prevention method for floods and debris flows caused by glacial lake outbursts according to claim 1, wherein the safety factor k is determined to be 1.2-3.0; the coefficients of the width of flowing section β are 1.5-3.0.

7. The prevention method for floods and debris flows caused by glacial lake outbursts according to claim 1, wherein the geometry of the upper and lower drainage channels is designed as rectangular, compound, and asymmetric shapes; wherein the flow discharge are checked according to the different geometries of the channels.

8. The prevention method for floods and debris flows caused by glacial lake outbursts according to claim 1, wherein the spacing (L) between adjacent pile-group dams is determined to be (50-100)*D.

9. The prevention method for floods and debris flows caused by glacial lake outbursts according to claim 1, wherein $B_{Up}$ and $h_{up}$ satisfy $B_{Up} = (1.0-4.0)*h_{Up}$.

\* \* \* \* \*